US011866122B2

(12) United States Patent
Nagata et al.

(10) Patent No.: US 11,866,122 B2
(45) Date of Patent: Jan. 9, 2024

(54) LEANING VEHICLE

(71) Applicant: YAMAHA HATSUDOKI KABUSHIKI KAISHA, Iwata (JP)

(72) Inventors: Tatsuya Nagata, Shizuoka (JP); Nobuo Hara, Shizuoka (JP)

(73) Assignee: YAMAHA HATSUDOKI KABUSHIKI KAISHA, Iwata (JP)

(*) Notice: Subject to any disclaimer, the term of this patent is extended or adjusted under 35 U.S.C. 154(b) by 0 days.

(21) Appl. No.: 17/684,280

(22) Filed: Mar. 1, 2022

(65) Prior Publication Data

US 2022/0250706 A1 Aug. 11, 2022

Related U.S. Application Data

(63) Continuation-in-part of application No. PCT/JP2020/033273, filed on Sep. 2, 2020.

(30) Foreign Application Priority Data

Sep. 2, 2019 (JP) .................................. 2019-159394

(51) Int. Cl.
B62K 5/10 (2013.01)
B62J 45/20 (2020.01)
B62J 45/413 (2020.01)
B62J 45/422 (2020.01)
B62K 5/05 (2013.01)

(52) U.S. Cl.
CPC ................ *B62K 5/10* (2013.01); *B62J 45/20* (2020.02); *B62J 45/413* (2020.02); *B62J 45/422* (2020.02); *B62K 5/05* (2013.01)

(58) Field of Classification Search
CPC ....................................................... B62K 5/10
See application file for complete search history.

(56) References Cited

U.S. PATENT DOCUMENTS

2020/0269916 A1* 8/2020 Doerksen ............. B62J 45/4151
2020/0307553 A1* 10/2020 Oshida .................. B60T 13/686

FOREIGN PATENT DOCUMENTS

| EP | 3378749 A1 | 9/2018 |
| JP | H01309874 A | 12/1989 |
| JP | H10291484 A | 11/1998 |
| JP | 2009-126380 A | 6/2009 |
| JP | 2018-172073 A | 11/2018 |

(Continued)

*Primary Examiner* — Paul N Dickson
*Assistant Examiner* — Shams Dhanani
(74) *Attorney, Agent, or Firm* — Rabin & Berdo, P.C.

(57) ABSTRACT

A leaning vehicle including a vehicle body, at least one front wheel, at least one rear wheel, a leaning device that causes the vehicle body, the at least one front wheel and the at least one rear wheel to lean leftward or rightward at the left-turn or right-turn of the leaning vehicle, a steering handle rotatable counter-clockwise or clockwise to turn the at least one front wheel left or right, a lean actuator supplying power to the leaning device, and a control unit that controls the lean actuator in accordance with an amount of rotation of the steering handle detected by a steering-handle rotation sensor. The control unit is configured to, when the steering handle is rotated within a particular rotation range, control the lean actuator to restrain the vehicle body, the at least one front wheel and the at least one rear wheel from leaning.

7 Claims, 7 Drawing Sheets

(56) References Cited

FOREIGN PATENT DOCUMENTS

| | | |
|---|---|---|
| JP | 2019-001200 A | 1/2019 |
| JP | 2019064535 A | 4/2019 |
| WO | 2017/086352 A1 | 5/2017 |
| WO | 2019045109 A1 | 3/2019 |

* cited by examiner

Lean Actuator Leaning Vehicle Body (in Normal Cases)

Rider Leaning Vehicle Body by Shifting Weight (in Case of Trouble)

Rider Leaning Vehicle Body by Performing Counter Steering (in Case of Trouble)

Rider Leaning Vehicle Body by Operating Acceleration Operator (in Case of Trouble)

Lean Actuator Raising Vehicle Body (in Normal Cases)

Rider Leaning Vehicle Body by Shifting Weight (in Case of Trouble)

Rider Leaning Vehicle Body by Performing Counter Steering (in Case of Trouble)

Rider Leaning Vehicle Body by Operating Acceleration Operator (in Case of Trouble)

LEANING VEHICLE

CROSS-REFERENCE TO RELATED APPLICATIONS

This is a continuation-in-part application of International Application PCT/JP2020/033273, filed on Sep. 2, 2020, which claims priority from Japanese Patent Application No. 2019-159394, filed on Sep. 2, 2019. The contents of the applications are incorporated herein by reference.

TECHNICAL FIELD

The present teaching relates to a leaning vehicle, and more particularly to a leaning vehicle of which the vehicle body is leaned by a lean actuator in accordance with operation of the steering handle that is mechanically connected to the front wheel(s).

BACKGROUND ART

Conventionally, there has been known a leaning vehicle of which the vehicle body is leaned by a lean actuator in accordance with operation of the steering handle that is mechanically connected to the front wheel(s). In such a leaning vehicle, since the steering handle is connected to the front wheel(s) mechanically, the traveling direction of the front wheel(s) is changed when the rider operates the steering handle. Such a leaning vehicle is disclosed, for example, in International Patent Application Publication WO2017/86352.

CITATION LIST

Patent Literature

Patent Literature 1: International Patent Application Publication WO2017/86352

SUMMARY OF INVENTION

Technical Problem

An objective of the present teaching is to provide a leaning vehicle that is more highly controllable in response to the rider's operation of the steering handle that is mechanically connected to the front wheel(s).

Solution to the Problem

A leaning vehicle according to an embodiment of the present teaching includes: a vehicle body; one or two front wheels supported by the vehicle body; one or two rear wheels supported by the vehicle body, the number of rear wheels being two when the number of front wheels is one and the number of rear wheels being one or two when the number of front wheels is two; a leaning device that leans the vehicle body, the front wheel(s) and the rear wheel(s) leftward when the leaning vehicle turns left and leans the vehicle body, the front wheel(s) and the rear wheel(s) rightward when the leaning vehicle turns right; a steering handle that is mechanically connected to the front wheel(s) and is rotatable by a rider of the leaning vehicle to change the traveling direction of the front wheel(s), the steering handle being rotated counter-clockwise to turn the front wheel(s) left and being rotated clockwise to turn the front wheel(s) right; a lean actuator that is connected to the leaning device and supplies a power to the leaning device for leaning of the vehicle body, the front wheel(s) and the rear wheel(s); and a control unit that controls the lean actuator in accordance with a signal outputted and sent from a steering-handle rotation sensor that detects the amount of rotation of the steering handle. A position of the steering handle that permits the leaning vehicle to go straight is defined as the neutral position, a range in which the steering handle is rotatable counter-clockwise from the neutral position is defined as counter-clockwise rotatable range, a range that is a part of the counter-clockwise rotatable range and continuous from the neutral position is defined as first counter-clockwise rotation range, a range in which the steering handle is rotatable clockwise from the neutral position is defined as clockwise rotation range, and a range that is a part of the clockwise rotatable range and continuous from the neutral position is defined as first clockwise rotatable range. When the rider rotates the steering handle within the first counter-clockwise rotation range or the first clockwise rotation range to turn the front wheel(s), which are mechanically connected to the steering handle, left or right and thereby mechanically changes the traveling direction of the front wheel(s), the control unit controls the lean actuator such that the leaning device restrains the vehicle body, the front wheel(s) and the rear wheel(s) from leaning along with the rotation of the steering handle.

According to the leaning vehicle, when the rider of the leaning vehicle rotates the steering handle, which is mechanically connected to the front wheel(s), within the first counter-clockwise rotation range or the first clockwise rotation range, the rotation of the steering handle is mechanically transmitted to the front wheel(s), whereby the traveling direction of the front wheel(s) is mechanically changed. At the same time, the vehicle body can be restrained from leaning rightward or leftward. Thus, as long as the rider rotates the steering handle, which is mechanically connected to the front wheel(s), within the first counter-clockwise rotation range or the first clockwise rotation range, the traveling direction of the front wheel(s) can be changed mechanically while the vehicle body is, for example, kept perfectly or almost upright. As a result, the controllability of the leaning vehicle in response to the rider's operation of the steering handle can be enhanced.

In the embodiment of the present teaching, the vehicle body includes a vehicle body frame. The vehicle body frame may be a frame assembled from a plurality of components, or a frame formed as a one-piece body of a plurality of parts. The material of the vehicle body frame may be metal such as aluminum, iron, or the like, synthetic resin such as CFRP or the like, or a combination of metal and synthetic resin. The vehicle body frame may be a monocoque type that is formed of exterior parts of the leaning vehicle or may be a semi-monocoque type, part of which also functions as the exterior of the leaning vehicle.

In the embodiment of the present teaching, the one or two front wheels are supported by the vehicle body, for example, in such a manner as to be rotatable around an axis extending in the upward-downward direction of the vehicle body. The axis extending in the upward-downward direction of the vehicle body does not necessarily extend in the vertical direction when the vehicle body is upright. The axis extending in the upward-downward direction of the vehicle body, for example, may be inclined backward from the vertical direction when the vehicle body is upright. In other words, an upper part of the axis extending in the upward-downward direction of the vehicle body may be in a more rearward position than a lower part of the axis.

In the embodiment of the present teaching, the front wheel(s) may be supported, for example, by the vehicle body directly or indirectly. The indirect way of supporting the front wheel(s) by the vehicle body includes, for example, using a suspension that is located between the front wheel(s) and the vehicle body and connects the front wheel(s) to the vehicle body. If the suspension is used to support one front wheel by the vehicle body, the suspension is, for example, a telescopic type or a bottom link type front fork. If the suspension is used to support two front wheels by the vehicle body, the suspension is, for example, an independent suspension. The two front wheels are arranged, for example, side by side in the leftward-rightward direction of the leaning vehicle.

In the embodiment of the present teaching, the rear wheel(s) may be supported, for example, by the vehicle body directly or indirectly. The indirect way of supporting the rear wheel(s) by the vehicle body includes, for example, using a suspension that is located between the rear wheel(s) and the vehicle body and connects the rear wheel(s) to the vehicle body. If the suspension is used to support one rear wheel by the vehicle body, the suspension is, for example, a swing arm suspension. If the suspension is used to support two rear wheel(s) by the vehicle body, the suspension is, for example, an independent suspension. The two rear wheels are arranged, for example, side by side in the leftward-rightward direction of the leaning vehicle.

In the embodiment of the present teaching, the leaning device, for example, includes a link mechanism that is shape-changeable by a power transmitted from the lean actuator. Such a link mechanism, for example, includes a parallelogram-link leaning mechanism that leans two front wheels. How the leaning device leans the vehicle body, the front wheel(s) and the rear wheel(s) leftward or rightward includes the leaning device leaning any of the vehicle body, the front wheel(s) and the rear wheel(s) leftward or rightward, followed by leftward or rightward leaning of the others of the vehicle body, the front wheel(s) and the rear wheel(s).

In the embodiment of the present teaching, the lean actuator may be connected to the leaning device directly or indirectly. The lean actuator, for example, includes an output member mechanically connected to the leaning device. The way of mechanically connecting the output member to the leaning device, for example, includes a way to permit power transmission from the output member to the leaning device. The lean actuator is, for example, an electric motor that includes an output member that is rotatable forward and in reverse. How the lean actuator supplies a power to the leaning device for leaning of the vehicle body, the front wheel(s) and the rear wheel(s) includes, for example, changing the shape of the link mechanism of the leaning device by a power supplied from the lean actuator. How the lean actuator supplies a power to the leaning device for leaning of the vehicle body, the front wheel(s) and the rear wheel(s) includes, for example, the lean actuator supplying a power to the leaning device for leaning of any of the vehicle body, the front wheel(s) and the rear wheel(s) leftward or rightward, followed by adjustment of leaning of the others of the vehicle body, the front wheel(s) and the rear wheel(s).

In the embodiment of the present teaching, the way of mechanically connecting the steering handle to the front wheel(s) includes, for example, a way to permit power transmission from the steering handle to the front wheel(s). The way of mechanically connecting the steering handle to the front wheel(s) includes, for example, connecting the steering handle to the axle(s) of the front wheel(s). The way of mechanically connecting the steering handle to the front wheel(s) includes, for example, connecting the steering handle to the front wheel(s) via a suspension that permits the front wheel(s) to be supported by the vehicle body. How the steering handle is rotated includes, for example, the steering handle being rotated around an axis extending in the upward-downward direction of the vehicle body within less than 360 degrees. The axis extending in the upward-downward direction of the vehicle body does not necessarily extend in the vertical direction when the vehicle body is upright. The signal outputted and sent from the steering-handle rotation sensor, which indicates the amount of rotation of the steering handle, may be an analogue signal or a digital signal.

In the embodiment of the present teaching, the control unit is, for example, an ECU (electric control unit). The ECU is implemented, for example, by a combination of an IC (integrated circuit), an electronic component, a circuit board, and the like. The control unit performs control, for example, when a CPU (central processing unit) reads a program stored in a non-volatile memory and carries out a specified procedure following the program.

In the embodiment of the present teaching, the counter-clockwise rotation of the front wheel(s) and the steering handle is counterclockwise rotation from above. The clockwise rotation of the front wheel(s) and the steering handle is clockwise rotation from above.

In the embodiment of the present teaching, for example, when the counter-clockwise rotatable range is divided into a plurality of divisions, the first counter-clockwise rotation range is the closest division to the neutral position among these divisions. The first counter-clockwise rotation range, for example, may be narrower than the total range of the other divisions. For example, when the clockwise rotatable range is divided into a plurality of divisions, the first clockwise rotation range is the closest division to the neutral position among these divisions. The first clockwise rotation range, for example, may be narrower than the total range of the other divisions.

In the embodiment of the present teaching, when the steering handle is rotated beyond the first counter-clockwise rotation range in the counter-clockwise rotatable range, the control unit may control the lean actuator such that the leaning device leans the vehicle body, the front wheel(s) and the rear wheel(s) leftward. When the steering handle is rotated beyond the first counter-clockwise rotation range in the counter-clockwise rotatable range, the control unit may control the lean actuator such that the leaning device leans the vehicle body, the front wheel(s) and the rear wheel(s) leftward in accordance with the amount of the counter-clockwise rotation of the steering handle. The mode in which when the steering handle is rotated within the first counter-clockwise rotation range, the control unit controls the lean actuator such that the leaning device restrains the vehicle body, the front wheel(s) and the rear wheel(s) from leaning along with the rotation of the steering handle includes, for example, the control unit controlling the lean actuator such that the leaning device causes the vehicle body, the front wheel(s) and the rear wheel(s) to lean less, compared with a case in which the steering handle is rotated beyond the first counter-clockwise rotation range in the counter-clockwise rotatable range.

In the embodiment of the present teaching, when the steering handle is rotated beyond the first clockwise rotation range in the clockwise rotatable range, the control unit may control the lean actuator such that the leaning device leans the vehicle body, the front wheel(s) and the rear wheel(s)

rightward. When the steering handle is rotated beyond the first clockwise rotation range in the clockwise rotatable range, the control unit may control the lean actuator such that the leaning device leans the vehicle body, the front wheel(s) and the rear wheel(s) rightward in accordance with the amount of the clockwise rotation of the steering handle. The mode in which when the steering handle is rotated within the first clockwise rotation range, the control unit controls the lean actuator such that the leaning device restrains the vehicle body, the front wheel(s) and the rear wheel(s) from leaning along with the rotation of the steering handle includes, for example, the control unit controlling the lean actuator such that the leaning device causes the vehicle body, the front wheel(s) and the rear wheel(s) to lean less, compared with a case in which the steering handle is rotated beyond the first clockwise rotation range in the clockwise rotatable range.

Restraining the vehicle body, the front wheel(s) and the rear wheel(s) from leaning means making a change in the degree of leaning or lean angle along with rotation of the steering handle smaller than a change in the degree of leaning or lean angle along with the rotation of the steering handle when the control unit does not perform the control to restrain the leaning. Restraining the vehicle body, the front wheel(s) and the rear wheel(s) from leaning includes making a zero change in the degree of leaning or lean angle along with rotation of the steering handle. Restraining the vehicle body, the front wheel(s) and the rear wheel(s) from leaning may include making a power required for leaning of the vehicle body, the front wheel(s) and the rear wheel(s) greater than a power required for the leaning when the control unit does not perform the control to restrain the leaning.

In the leaning vehicle according to the embodiment of the present teaching, when the rider rotates the steering handle within the first counter-clockwise rotatable range or the first clockwise rotatable range to turn the front wheel(s), which are mechanically connected to the steering handle, and thereby to mechanically changes the traveling direction of the front wheel(s), the control unit controls the lean actuator preferably such that the leaning device keeps the vehicle body, the front wheel(s) and the rear wheel(s) upright.

In the embodiment of the present teaching, a phrase referring to the vehicle body being upright means that the vehicle body is substantially upright for the rider of the leaning vehicle. Such a state of the vehicle body includes a state in which the lean angle of the vehicle body is actually within ±3 degrees. Such a state of the vehicle body is preferably a state in which the lean angle of the vehicle body is actually within ±2 degrees. A phrase referring to controlling the lean actuator such that the vehicle body is kept upright may mean controlling the lean actuator with the target value of lean angle set to ±3 degrees. Even when the target value of lean angle to keep the vehicle body upright is set to ±0 degrees, the actual lean angle of the vehicle body may become within ±3 degrees depending on the accuracy of the sensor that detects the lean angle of the vehicle body and/or the accuracy of the lean actuator. This case is included in controlling the lean actuator such that the vehicle body is kept upright. The same applies to a phrase referring to the front wheel(s) being upright and a phrase referring to the rear wheel(s) being upright, and any detailed descriptions of these phrases will not be given.

In the embodiment of the present teaching, the steering handle is rotated around its axis, and in a left or right side view of the leaning vehicle, the intersection point between the axis of rotation of the steering handle and a road surface is preferably in a more frontward position than the contact point of the front wheel(s) with the road surface.

In the embodiment of the present teaching, the steering-handle rotation sensor is configured to not change the output signal when the steering handle is rotated within the first counter-clockwise rotation range or the first clockwise rotation range.

In the embodiment of the present teaching, the steering-handle rotation sensor, for example, includes a movable contact point that moves together with the steering handle during rotation of the steering handle, and a fixed contact point that is capable of coming into contact with the movable contact point. In this case, the way of configuring the steering-handle rotation sensor to not change the output signal when the steering handle is rotated within the first counter-clockwise rotation range or the first clockwise rotation range includes, for example, preventing the movable contact point from coming into contact with the fixed contact point when the steering handle is rotated within the first counter-clockwise rotation range or the first clockwise rotation range, and preventing the steering-handle rotation sensor from changing the output signal though allowing the movable contact point to come into contact with the fixed contact point when the steering handle is rotated within the first counter-clockwise rotation range or the first clockwise rotation range. The steering-handle rotation sensor may be a steering angle sensor that is capable of detecting the steering angle within the entire steerable range. A conventional sensor is usable as such a steering angle sensor.

Some embodiments of the present teaching will hereinafter be described in detail with reference to the drawings, and the detailed description of the embodiments will provide a clearer picture of the above-mentioned object and other objects, the features, the aspects and the advantages of the present teaching. The term "and/or" used herein includes one of the associated items in a list and all possible combinations of the associated items. The terms "including", "comprising", or "having", and variations thereof used herein specify the presence of stated features, steps, operations, elements, components, and/or equivalents thereof, and can include one or more of steps, operations, elements, components, and/or their groups. Unless otherwise defined, all terms (including technical and scientific terms) used herein have the same meanings as commonly understood by one of ordinary skill in the art to which the present teaching pertains. It should be understood that terms, such as those defined in commonly used dictionaries, should be interpreted as having meanings that are consistent with their meanings in the context of the present disclosure and relevant art and should not be interpreted in an idealized or overly formal sense unless expressly so defined herein. It should be understood that the description of the present teaching discloses a number of techniques and steps. Each of these has individual benefit, and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims. In the description given below, for the purpose of explanation, numerous specific details are set forth in order to provide a complete understanding of the present teaching. It will be apparent, however, that those skilled in the art may practice the present teaching without these specific details. The present disclosure is to be considered as an exemplification of the present teaching and is not intended to limit the present teaching to the specific embodiments illustrated by drawings or descriptions below.

Effect of Invention

The present teaching provides a leaning vehicle that is more highly controllable in response to the rider's operation of the steering handle that is mechanically connected to the front wheel(s).

DESCRIPTION OF EMBODIMENTS

Leaning vehicles according to some embodiments of the present teaching will hereinafter be described in detail with reference to the drawings. The embodiments described below are merely examples. The present teaching shall not be understood to be limited to the embodiments below.

Figure 1:
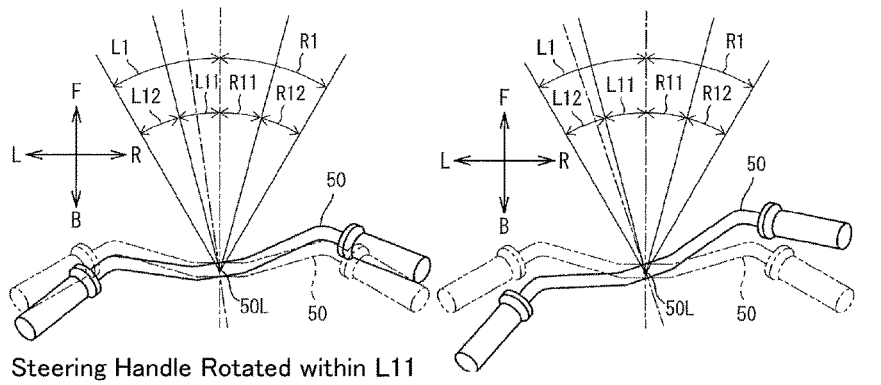
FIG. 1 is a diagram including a block diagram showing a system for lean control of a leaning vehicle according to an embodiment of the present teaching and illustration diagrams showing the lean control.
Figure 1:
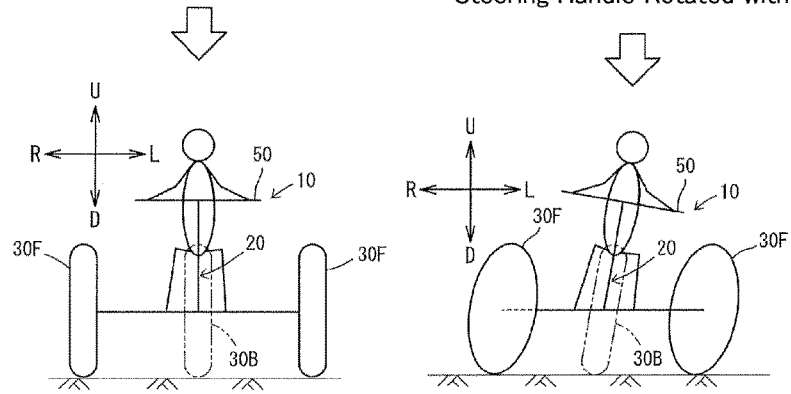
Figure 1:
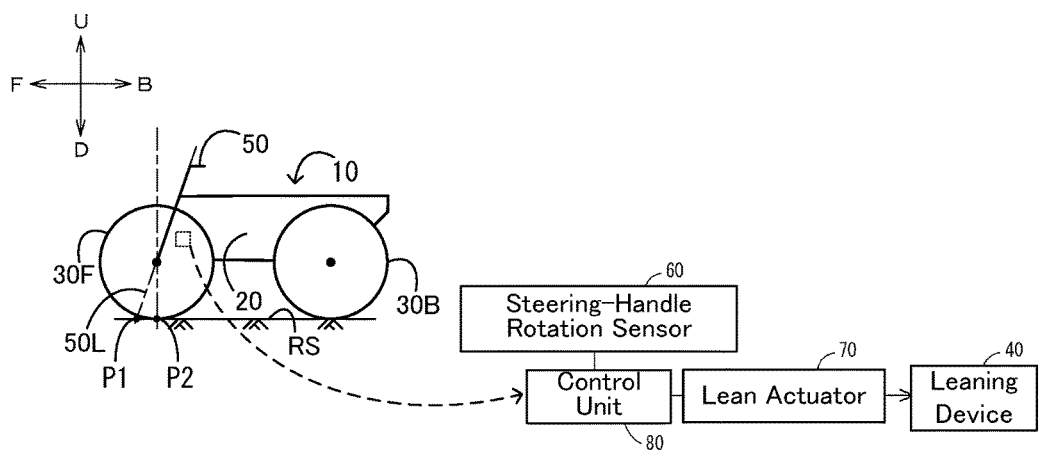

With reference to FIG. 1, a leaning vehicle 10 according to an embodiment of the present teaching will be described. FIG. 1 is a diagram including a block diagram showing a system for lean control of the leaning vehicle 10 and illustration diagrams showing the lean control.

In the description below, directions relative to the leaning vehicle 10 are directions from the perspective of a rider sitting on the seat of the leaning vehicle 10. The vehicle body 20 of the leaning vehicle 10 is capable of leaning leftward L and rightward R. When the vehicle body 20 leans leftward L or rightward R, the upward-downward direction and the leftward-rightward direction of the vehicle body are not the same with the upward-downward direction UD and the leftward-rightward direction LR of the leaning vehicle 10. However, when the vehicle body 20 is upright, the upward-downward direction and the leftward-rightward direction of the vehicle body are the same with the upward-downward direction UD and the leftward-rightward direction LR of the leaning vehicle 10, respectively.

As shown in FIG. 1, the leaning vehicle 10 includes two front wheels 30F, one rear wheel 30B, a leaning device 40, a steering handle 50, a steering-handle rotation sensor 60, a lean actuator 70, and a control unit 80, in addition to the vehicle body 20. These will be described below.

The vehicle body 20 includes, for example, a vehicle body frame. The two front wheels 30F are supported by the vehicle body 20. The two front wheels 30F are arranged side by side in the leftward-rightward direction LR. The two front wheels 30F are supported by the vehicle body 20 in such a manner as to be rotatable around an axis 50L extending in the upward-downward direction of the vehicle body 20. The rear wheel 30B is supported by the vehicle body 20.

When the leaning vehicle 10 is turning left L, the leaning device 40 leans the vehicle body 20, the two front wheels 30F and the rear wheel 30B leftward L. When the leaning vehicle 10 is turning right R, the leaning device 40 leans the vehicle body 20, the two front wheels 30F and the rear wheel 30B rightward R.

The steering handle 50 is mechanically connected to the two front wheels 30F. When the rider of the leaning vehicle 10 rotates the steering handle 50, which is mechanically connected to the two front wheels 30F, the traveling direction of the two front wheels 30F is changed. Thus, the leaning vehicle 10 is not a type of vehicle that controls steering of the two front wheels 30F by wire.

The steering handle 50 is placed in such a manner as to be rotatable around the axis 50L extending in the upward-downward direction of the vehicle body 20. Thus, the axis 50L is the axis of rotation of the steering handle 50. The range in which the steering handle 50 is rotatable leftward (counterclockwise in FIG. 1) from a neutral position is the same in width as the range in which the steering handle 50 is rotatable rightward (clockwise in FIG. 1) from the neutral position. The neutral position of the steering handle 50 is the position of the steering handle 50 when the steering handle 50 is not rotated. When the steering handle 50 is in the neutral position, from an upward or downward view of the vehicle body 20, a line crossing the axis 50L of the steering handle 50 and extending in the frontward-backward direction of the vehicle body is parallel to the frontward-backward direction of the vehicle body 20.

When viewed from a leftward (L) or rightward (R) position, the axis 50L is inclined from the vertical direction in such a manner that an upper part of the axis 50L is in a more rearward position. Accordingly, when viewed from a leftward (L) or rightward (R) position, the intersection point P1 between the axis 50L and a road surface RS is in a more frontward position than the contact point P2 of each of the two front wheels 30L with the road surface RS. In other words, the leaning vehicle 10 has a positive trail value.

The steering handle 50 is rotated counter-clockwise from the neutral position (position indicated by phantom line in FIG. 1) for a leftward (L) turn of the leaning vehicle 10. The steering handle 50 is rotated clockwise, which is the opposite direction to the counter-clockwise, from the neutral position (position indicated by phantom line in FIG. 1) for a rightward (R) turn of the leaning vehicle 10.

The steering-handle rotation sensor 60 detects the amount of rotation of the steering handle 50. The steering-handle rotation sensor 60, for example, outputs a signal indicating the counter-clockwise rotation angle of the steering handle 50 from the neutral position and sends the signal to the control unit 80. The steering-handle rotation sensor 60, for example, outputs a signal indicating the clockwise rotation angle of the steering handle 50 from the neutral position and sends the signal to the control unit 80.

The lean actuator 70 is connected to the leaning device 40. The lean actuator 70 is, for example, an electric motor that is mechanically connected to the leaning device 40 and includes an output member that is rotatable forward and in reverse. The lean actuator 70 supplies a power to the leaning device 40 for leaning of the vehicle body 20, the two front wheels 30F and the rear wheel 30B.

The control unit 80 controls the lean actuator 70, depending on the signal indicating the amount of rotation of the steering handle 50, which is sent from the steering-handle rotation sensor 60. When the steering handle 50 is rotated within a particular left-side range (which will hereinafter be referred to as first counter-clockwise rotation range L11), the control unit 80 controls the lean actuator 70 such that the vehicle body 20 is restrained from leaning. When the steering handle 50 is rotated within a particular right-side range (which will hereinafter be referred to as first clockwise rotation range R11), the control unit 80 controls the lean actuator 70 such that the vehicle body 20 is restrained from leaning.

The steering handle 50 is rotatable counter-clockwise from the neutral position within a range L1, and the range (counter-clockwise rotatable range) L1 is divided into a first counter-clockwise rotation range L11 and a second counter-clockwise rotation range L12. The first counter-clockwise rotation range L11 is closer to the neutral position, and the second counter-clockwise rotation range L12 is farther from the neutral position and includes the limit of the counter-clockwise rotatable range L1. The range L11 may be narrower than the range L12. The range L11 may be the same as the range L12 in width. The range L11 may be wider than the range L12. The steering handle 50 is rotatable clockwise from the neutral position within a range R1, and the range (clockwise rotatable range) R1 is divided into a first clockwise rotation range R11 and a second clockwise rotation range R12. The first clockwise rotation range R12 is closer to the neutral position, and the second clockwise rotation range R12 is farther from the neutral position and includes the limit of the clockwise rotatable range R1. The range R11 may be narrower than the range R12. The range R11 may be the same as the range R12 in width. The range R11 may be wider than the range R12.

When the steering handle 50 is rotated within the range L12, the control unit 80 controls the lean actuator 70 such that the more the steering handle 50 is rotated counter-clockwise, the more the vehicle body 20, the front wheels 30F and the rear wheel 30R lean leftward L. When the steering handle 50 is rotated within the range L12, the control unit 80 does not restrain the vehicle body 20, the front wheels 30F and the rear wheel 30R from leaning leftward L. When the steering handle 50 is rotated within the range R12, the control unit 80 controls the lean actuator 70 such that the more the steering handle 50 is rotated clockwise, the more the vehicle body 20, the front wheels 30F and the rear wheel 30R lean rightward R. When the steering handle 50 is rotated within the range R12, the control unit 80 does not restrain the vehicle body 20, the front wheels 30F and the rear wheel 30R from leaning rightward R.

FIG. 1 shows a case in which the steering handle 50 is rotated within the range L11 and a case in which the steering handle 50 is rotated within the range L12. When the steering handle 50 is rotated within the range L11, the vehicle body 20 is kept upright. On the other hand, when the steering handle 50 is rotated within the range L12, the vehicle body 20 leans leftward L in accordance with the amount of counter-clockwise rotation of the steering handle 50. When the steering handle 50 is rotated within the range R11, as with the case in which the steering handle 50 is rotated within the range L11, the vehicle body 20 is kept upright. When the steering handle 50 is rotated within the range R12, as with the case in which the steering handle 50 is rotated within the range L12, the vehicle body 20 leans rightward R in accordance with the amount of clockwise rotation of the steering handle 50.

Figure 2:
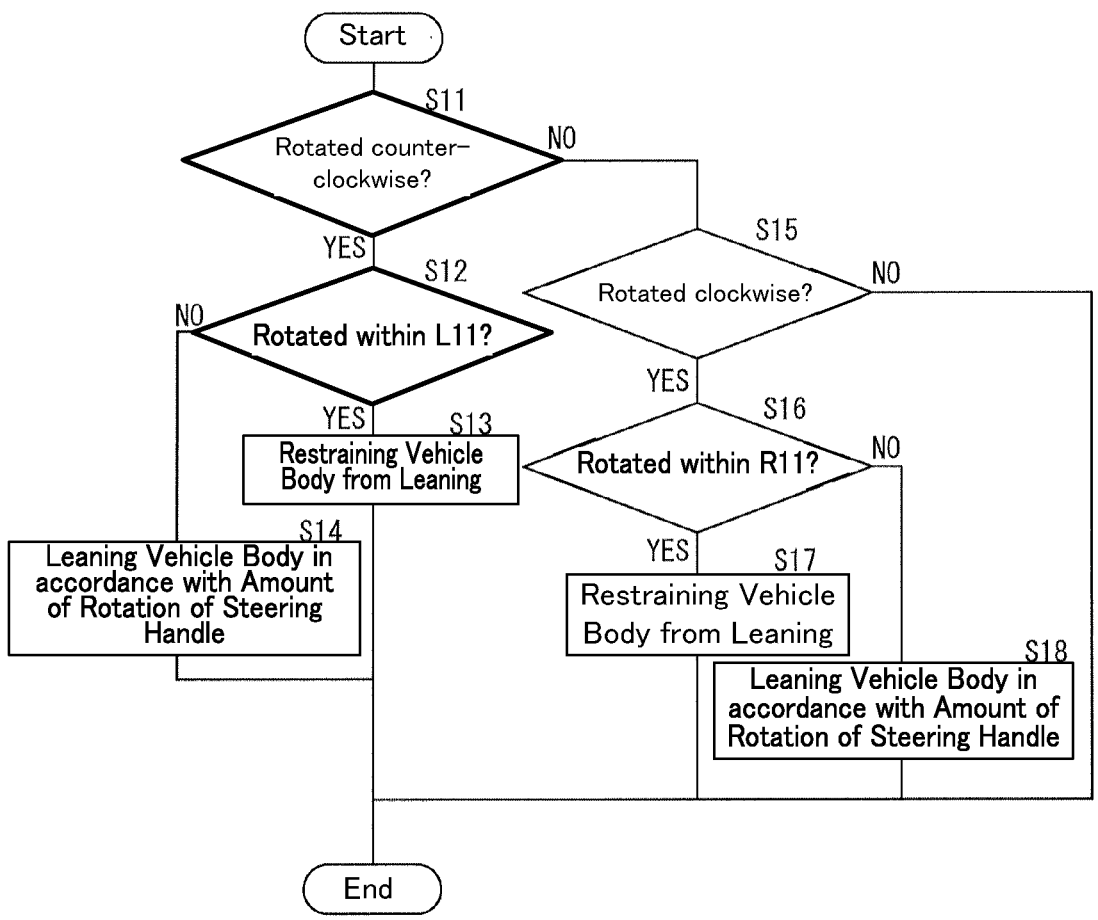
FIG. 2 is a flowchart showing a procedure of the lean control carried out by a control unit contained in the leaning vehicle.

With reference to FIG. 2, the lean control carried out by the control unit 80 will be described. First at step S11, the control unit 80 determines whether or not the steering handle 50 is rotated counter-clockwise. The determination as to whether or not the steering handle 50 is rotated counter-clockwise is made based on the signal sent from the steering-handle rotation sensor 60.

When the steering handle 50 is rotated counter-clockwise (YES at step S11), at step S12, the control unit 80 determines whether or not the steering handle 50 is rotated within the range L11. The determination as to whether or not the steering handle 50 is rotated within the range L11 is made based on the signal sent from the steering-handle rotation sensor 60.

When the steering handle 50 is rotated within the range L11 (YES at step S12), at step S13, the control unit 80 controls the lean actuator 70 such that the vehicle body 20 is restrained from leaning. Specifically, the control unit 80 controls the lean actuator 70 such that the vehicle body 20 is kept upright. Then, the control unit 80 completes the lean control.

When the steering handle 50 is not rotated within the range L11, that is, when the steering handle 50 is rotated within the range L12 (NO at step S12), at step S14, the control unit 80 controls the lean actuator 70 such that the vehicle body 20 is caused to lean in accordance with the amount of the counter-clockwise rotation of the steering handle 50. Specifically, the control unit 80 controls the lean actuator 70 such that the more the amount of the counter-clockwise rotation of the steering handle 50 is, the more the vehicle body 20 leans leftward L. Then, the control unit 80 completes the lean control.

When the steering handle 50 is not rotated counter-clockwise (NO at step S11), at step S15, the control unit 80 determines whether or not the steering handle 50 is rotated clockwise. The determination as to whether or not the steering handle 50 is rotated clockwise is made based on the signal sent from the steering-handle rotation sensor 60.

When the steering handle 50 is not rotated clockwise (NO at step S15), the control unit 80 terminates the lean control. When the steering handle 50 is rotated clockwise (YES at step S15), at step S16, the control unit 80 determines whether or not the steering handle 50 is rotated within the range R11. The determination as to whether or not the steering handle 50 is rotated within the range R11 is made based on the signal sent from the steering-handle rotation sensor 60.

When the steering handle 50 is rotated within the range R11 (YES at step S16), at step S17, the control unit 80 controls the lean actuator 70 such that the vehicle body 20 is restrained from leaning. Specifically, the control unit 80 controls the lean actuator 70 such that the vehicle body 20 is kept upright. Then, the control unit 80 completes the lean control.

When the steering handle 50 is not rotated within the range R11, that is, when the steering handle 50 is rotated within the range R12 (NO at step S16), at step S18, the control unit 80 controls the lean actuator 70 such that the vehicle body 20 is caused to lean in accordance with the amount of the clockwise rotation of the steering handle 50. Specifically, the control unit 80 controls the lean actuator 70 such that the more the amount of the clockwise rotation of the steering handle 50 is, the more the vehicle body 20 leans rightward R. Then, the control unit 80 completes the lean control.

In this way, when the steering handle 50 of the leaning vehicle 10 is rotated within the range L11 or within the range R11, the vehicle body 20 can be restrained from leaning while the traveling direction of the two front wheels 30F is changed in accordance with the rotation of the steering handle 50. Accordingly, as long as the steering handle 50 is rotated within the range L11 or the range R11, the traveling direction of the two front wheels 30F can be changed, for example, with the vehicle body 20 kept perfectly or almost upright. Thus, the controllability of the leaning vehicle 10 in response to the rider's operation of the steering handle 50 can be enhanced.

(Modification of Steering-Handle Rotation Sensor)

Figure 3:
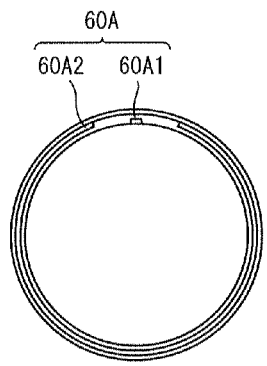
FIG. 3 is a diagram of an exemplary steering-handle rotation sensor that is configured to not change the output signal when the steering handle is rotated within a first counter-clockwise rotation range or a first clockwise rotation range.

The steering-handle rotation sensor may be configured to not change the output signal while the steering handle 50 is rotated within the range L11 or the range R11. Such a steering-handle rotation sensor will be described with reference to FIG. 6. FIG. 3 is a diagram of an exemplary steering-handle rotation sensor 60A that is configured to not change the output signal while the steering handle 50 is rotated within the range L11 or the range R11.

The steering-handle rotation sensor 60A includes a movable contact point 60A1 that moves together with the steering handle 50 during rotation of the steering handle 50, and a fixed contact point 60A2 with which the movable contact point 60A1 is capable of coming into contact. The movable contact point 60A1 is located, for example, on a steering shaft to which the steering handle 50 is fixed. The fixed contact point 60A2 is located, for example, on a head pipe in which the steering shaft is inserted.

In the steering-handle rotation sensor 60A, the movable contact point 60A1 does not come into contact with the fixed contact point 60A2 as long as the steering handle 50 is rotated within the range L11 or the range R11. Accordingly, while the steering handle 50 is rotated within the range L11 or the range R11, the signal outputted from the steering-handle rotation sensor 60A does not change.

The configuration to prevent the steering-handle rotation sensor from changing the output signal as long as the steering handle 50 is rotated within the range L11 or the range R11 may be a configuration to achieve the following: as long as the steering handle 50 is rotated within the range L11 or the range R11, the signal outputted from the steering-handle rotation sensor does not change though the movable contact point comes into contact with the fixed contact point.

[Another Leaning Vehicle]

Figure 4:
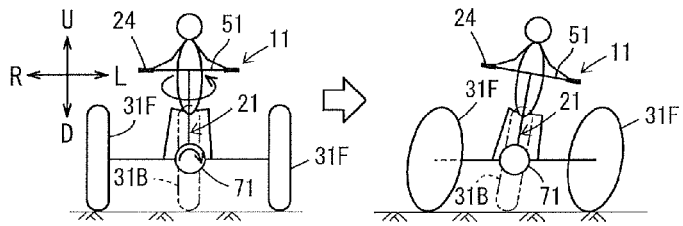
FIG. 4 is a diagram including a block diagram of a lean control system contained in another leaning vehicle and illustration diagrams showing how to manage trouble in the lean control system.
Figure 4:
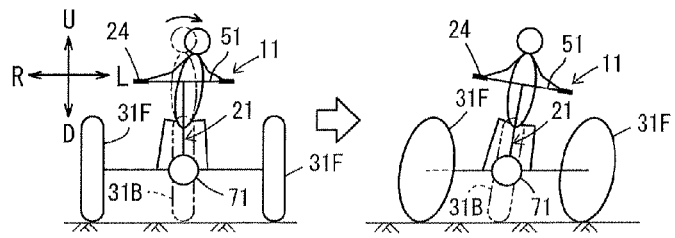
Figure 4:
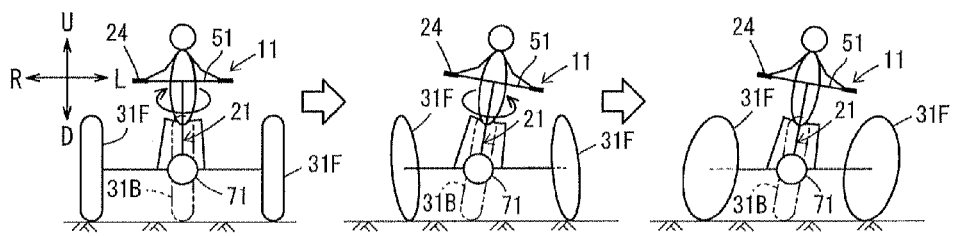
Figure 4:
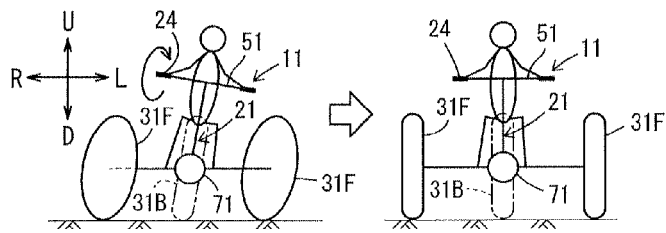
Figure 4:
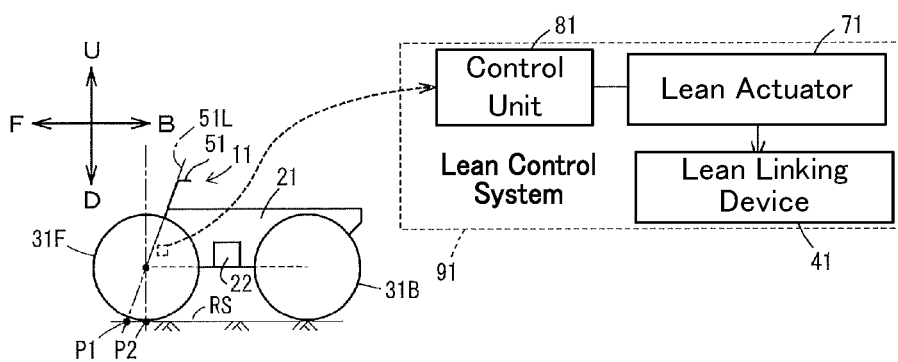

With reference to FIG. 4, a leaning vehicle 11 will be described. The leaning vehicle 11 includes a vehicle body 21, two front wheels 31F, one rear wheel 31B, a lean linking device 41, a steering handle 51, a lean actuator 71, and a control unit 81.

The vehicle body 21, for example, includes a vehicle body frame. The two front wheels 31F are supported by the vehicle body 21. In a cross-section including the rotation axis of each of the two front wheels 31F, the tread of each of the two front wheels 31F is curved. The two front wheels 31F are arranged side by side in the leftward-rightward direction LR. The two front wheels 31F are supported by the vehicle body 21 in such a manner as to be rotatable around a steering axis 51L extending in the upward-downward direction of the vehicle body 21.

When viewed from a leftward (L) or rightward (R) position, the steering axis 51L is inclined from the vertical direction in such a manner that an upper part of the steering axis 50L is in a more rearward position. Accordingly, when viewed from a leftward (L) or rightward (R) position, the intersection point P1 of the steering axis 50L and a road surface RS is in a more frontward position than the contact point P2 of each of the two front wheels 30L with the road surface RS.

The rear wheel 31B is supported by the vehicle body 21. In a cross-section including the rotation axis of the rear wheel 31B, the tread of the rear wheel 31B is curved.

When the leaning vehicle 11 is turning left L, the lean linking device 41 leans the vehicle body 21, the two front wheels 31F and the rear wheel 31B leftward L. When the leaning vehicle 11 is turning right R, the lean linking device 41 leans the vehicle body 21, the two front wheels 31F and the rear wheel 31B rightward R.

The steering handle 51 is mechanically connected to the two front wheels 31F. The steering handle 51 is mechanically connected to the respective rotation axes of the two front wheels 31F. When the rider of the leaning vehicle 11 rotates the steering handle 51, which is mechanically connected to the respective rotation axes of the two front wheels 31F, the two front wheels 31F rotate around the steering axis 51L. Accordingly, the traveling direction of the leaning vehicle 11 changes. Thus, the leaning vehicle 11 is not a type of vehicle that controls steering of the two front wheels 31F by wire.

The lean actuator 71 is connected to the lean linking device 41. The lean actuator 71 is, for example, an electric motor that is mechanically connected to the lean linking device 41 and includes an output member that is rotatable forward and in reverse. The lean actuator 71 supplies a power to the lean linking device 41 for leaning of the vehicle body 21, the two front wheels 31F and the rear wheel 31B. When the steering handle 51 is rotated, the lean actuator 71 supplies a power for leaning of the vehicle body 21, the two front wheels 31F and the rear wheel 31B. Specifically, when the steering handle 51 is rotated leftward (counterclockwise), the lean actuator 71 supplies a power to lean the vehicle body 21, the two front wheels 31F and the rear wheel 31B leftward. When the steering handle 51 is rotated rightward (clockwise), the lean actuator 71 supplies a power to lean the vehicle body 21, the two front wheels 31F and the rear wheel 31B rightward. The lean actuator 71 is controlled by the control unit 81.

The leaning vehicle 11 further includes a drive source 22 and an acceleration operator 24. The drive source 22 supplies a drive force to the rear wheel 31B. The drive source 22 may be, for example, an engine, an electric motor, or a combination of an engine and an electric motor. The drive source 22 is supported by the vehicle body 21. When the rider of the leaning vehicle 11 operates the acceleration operator 24, the drive force outputted from the drive source 22 is adjusted. The acceleration operator 24 is attached to the steering handle 51. Thus, the acceleration operator 24 is located in a position to be operable by the rider riding the leaning vehicle 11.

The leaning vehicle 11 includes a lean control system 91. The lean linking device 41, the lean actuator 71 and the control unit 81 are included in the lean control system 91. When some trouble occurs in the lean control system 91, the control unit 81 cuts off the supply of electricity to the lean actuator 71 or breaks the mechanical connection between the lean actuator 71 and the lean linking device 41. A mechanism that implements the breaking of the mechanical connection between the lean actuator 71 and the lean linking device 41 is, for example, a clutch mechanism that is electrically controlled by the control unit 81. Some examples of trouble that possibly occurs in the lean control system 91 will be described below. However, the trouble that may occur in the lean control system 91 is not limited to the examples.

A kind of trouble that possibly occurs in the lean control system 91 is, for example, that the lean actuator 71 does not work as designed. In this case, for example, the determination as to whether or not the lean control system 91 has trouble may be made based on the period from the time when the lean actuator 71 receives a command value until the time when the output of the lean actuator 71 reaches the command value. For example, by comparing the period from the time when the lean actuator 71 receives a command value until the time when the output of the lean actuator 71 reaches the command value with a time it takes for that in a normal state, it may be determined whether or not trouble has occurred in the lean control system 91.

Another kind of trouble that possibly occurs in the lean control system 91 is, for example, that a sensor used in the lean control system 91 has trouble. For example, when breaking, signal abnormality or the like is detected in a voltage sensor, a current sensor, a lean angle sensor or the like, it may be determined that trouble has occurred in the lean control system 91.

Figure 5:
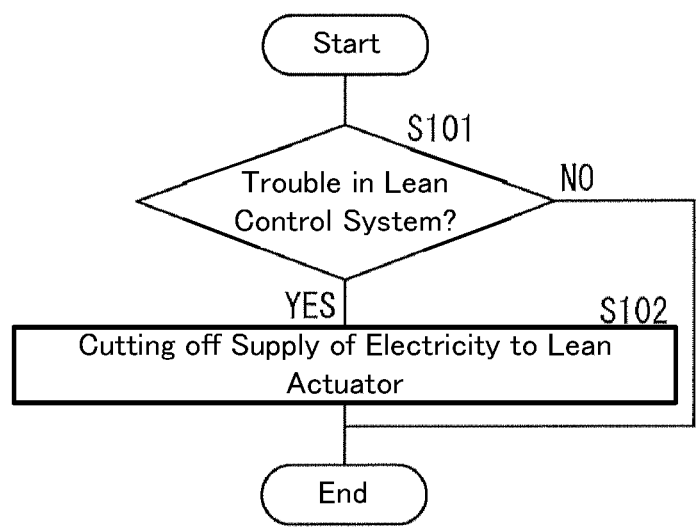
FIG. 5 is a flowchart showing an exemplary procedure of trouble management control carried out by the control unit of the leaning vehicle shown in FIG. 4.

With reference to FIG. 5, an example of trouble management control carried out by the control unit 81 will be described. First, at step S101, the control unit 81 determines whether or not the lean control system 91 has trouble. When any trouble has not occurred in the lean control system 91 (NO at step S101), the control unit 81 terminates the trouble management control. When trouble has occurred in the lean control system 91 (YES at step S101), at step S102, the control unit 81 cuts off the supply of electricity to the lean actuator. Then, the control unit 81 completes the trouble management control.

In the leaning vehicle 11 that carries out this control, when any trouble has not occurred in the lean control system 91, the power outputted from the lean actuator 71, which is in accordance with the operation of the steering handle 51 by the rider of the leaning vehicle 11, is transmitted to the vehicle body 21. Thereby, the vehicle body 21 leans.

When the leaning vehicle 11 has trouble in the lean control system 91, the rider can quickly move the leaning vehicle 11 to a safe area. Details will be described below.

When the leaning vehicle 11 has trouble in the lean control system 91, the supply of electricity to the lean actuator 71 is cut off. This can minimize the effect of the lean actuator 71 on the lean linking device 41.

In the leaning vehicle 11, even when the effect of the lean actuator 71 on the lean linking device 41 is minimized as described above, the vehicle body 21 can be leant left and right LR. Details will be described below.

When the leaning vehicle 11 is viewed from a leftward (L) or rightward (R) position, the steering axis 51L is inclined from the vertical direction such that an upper part of the steering axis 51L is in a more rearward position. Accordingly, when viewed from a leftward (L) or rightward (R) position, the intersection point P1 between the steering axis 51L and a road surface RS is in a more frontward position than the contact point P2 of each of the two front wheels 30L with the road surface RS. This means that the leaning vehicle 11 has a positive trail value. When the leaning vehicle 11 has a positive trail value, the rider of the leaning vehicle 11 can lean the vehicle body 21 left and right LR by performing counter steering. Specifically, the rider can lean the vehicle body 21 rightward R by rotating the steering handle 51 leftward (counterclockwise). Also, the rider can lean the vehicle body 21 leftward L by rotating the steering handle 51 rightward (clockwise). Thus, even when the effect of the lean actuator 71 on the lean linking device 41 is minimized, the rider of the leaning vehicle 11 can lean the vehicle body 21 left and right LR.

In a cross-section of the leaning vehicle 11 including the rotation axis of each of the two front wheels 31F, the tread of each of the two front wheels 31F is curved. Therefore, the rider of the leaning vehicle 11 can lean the vehicle body 21 left and right LR by shifting his or her weight. It is easy for the rider to lean the vehicle body 21 left and right LR by shifting his or her weight. Thus, even when the effect of the lean actuator 71 on the lean linking device 41 is minimized, the rider of the leaning vehicle 11 can lean the vehicle body 21 left and right LR.

The leaning vehicle 11 includes the drive source 22, which supplies a drive force to the two front wheels 31F, and the acceleration operator 24, which adjusts the drive force supplied from the drive source 22 when operated by the rider of the leaning vehicle 11. Accordingly, the rider can lean the vehicle body 21 left and right LR by operating the acceleration operator 24. Specifically, the rider of the leaning vehicle 11 can change the centripetal force by adjusting the moving speed of the leaning vehicle 11 while the leaning vehicle 21 is leaning (that is, while the leaning vehicle is turning), whereby the leftward (L) or rightward (R) leaning of the vehicle body 21 can be adjusted. In this way, even when the effect of the lean actuator 71 on the lean linking device 41 is minimized, the rider of the leaning vehicle 11 can lean the vehicle body 21 left and right LR.

[Another Example of Trouble Management Control]

Figure 6:
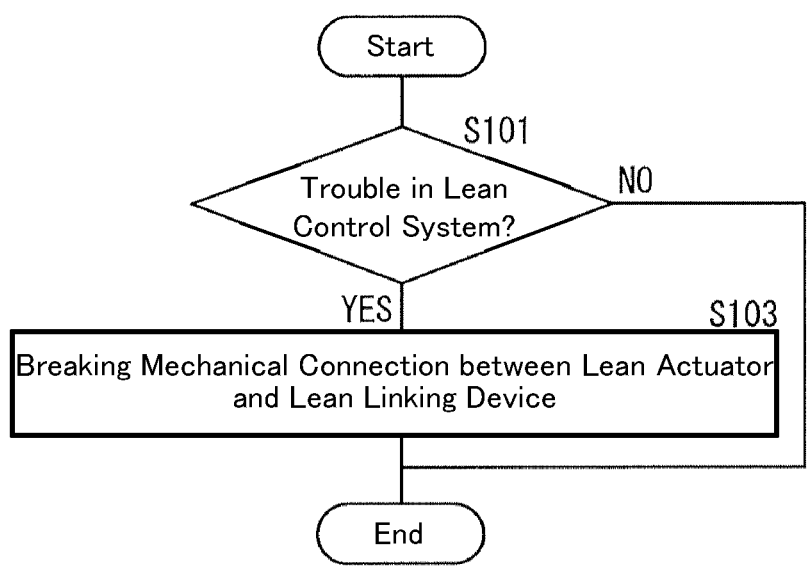
FIG. 6 is a flowchart showing another exemplary procedure of trouble management control carried out by the control unit of the leaning vehicle shown in FIG. 4.

Next, with reference to FIG. 6, another example of trouble management control carried out by the control unit 81 will be described. First at step S101, it is determined whether or not trouble has occurred in the lean control system 91. When any trouble has not occurred in the lean control system 91 (NO at step S101), the control unit 81 terminates the trouble management control. When trouble has occurred in the lean control system 91 (YES at step S101), at step S103, the control unit 81 breaks the mechanical connection between the lean actuator 71 and the lean liking device 41. Then, the control unit completes the trouble management control.

[Modification of Leaning Vehicle 11]

Figure 7:
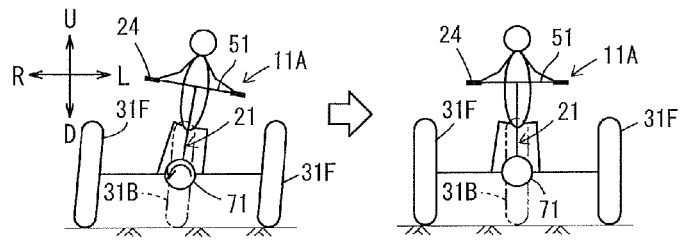
FIG. 7 is a diagram including a block diagram of a lean control system contained in a modified leaning vehicle and illustration diagrams showing how to manage trouble in the lean control system.
Figure 7:
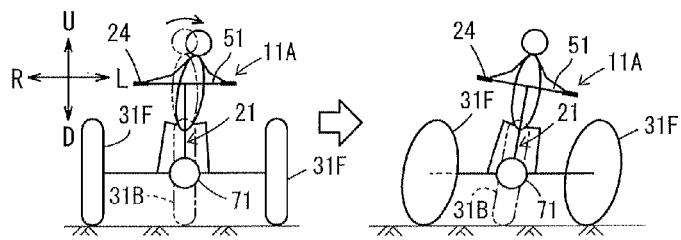
Figure 7:
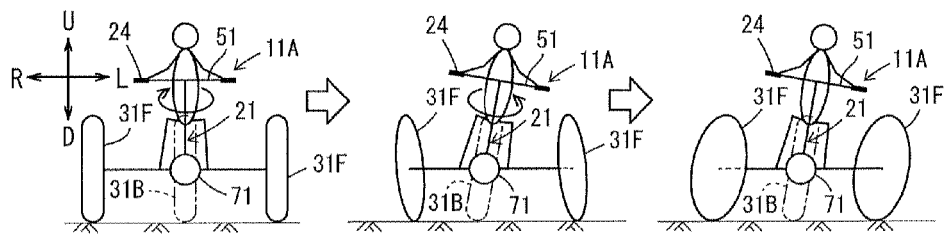
Figure 7:
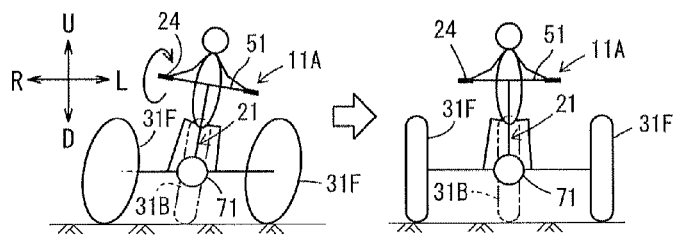
Figure 7:
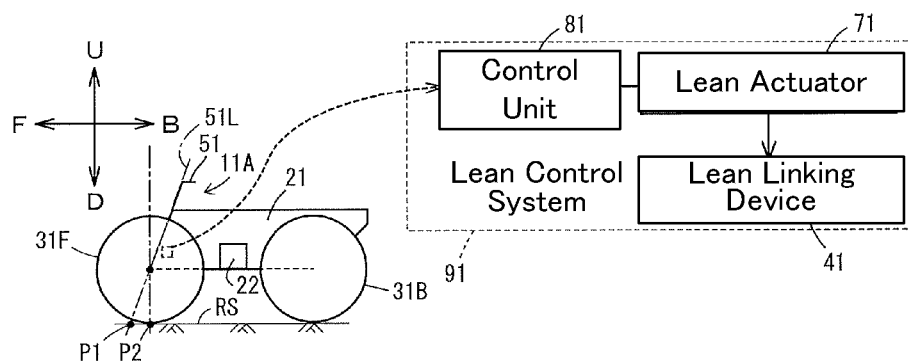

With reference to FIG. 7, a leaning vehicle 11A will be described. The lean actuator 71 of the leaning vehicle 11A raises the vehicle body 21 from a leaning state. Specifically, when the vehicle body 21 leans while the leaning vehicle 11A is decelerating to come to a stop, the lean actuator 71 raises the vehicle body 21.

Other Embodiments

The embodiments and modifications described above and/or illustrated by the drawings are to make the present teaching easier to understand and not to limit the concept of the present teaching. It is possible to adapt or alter the embodiments and modifications described above without departing from the gist thereof. The gist includes all equivalent elements, modifications, omissions, combinations (for example, combinations of features of the embodiments and modifications), adaptations and alterations as would be appreciated by those in the art based on the embodiments and modifications disclosed herein. The limitations in the claims are to be interpreted broadly based on the language employed in the claims and not limited to the embodiments described in the present specification or during the prosecution of the present application. Such embodiments and modifications are to be understood as non-exclusive. For example, the terms "preferable" and "good" in the present specification are to be understood as non-exclusive, and these terms mean "preferable but not limited to this" and "good but not limited to this", respectively.

LIST OF REFERENCE SIGNS

10: leaning vehicle
20: vehicle body
30F: front wheel
30B: rear wheel
40: leaning device
50: steering handle
50L: axis
60: steering-handle rotation sensor
70: lean actuator
80: control unit
90: vehicle speed sensor
L1: rotatable range
L11: range
L12: range
R1: rotatable range
R11: range
R12: range

The invention claimed is:

1. A leaning vehicle comprising:
a vehicle body;
at least one front wheel and at least one rear wheel, which are supported by the vehicle body and include
one front wheel and two rear wheels, or
two front wheels, and one or two rear wheels;
a leaning device that causes the vehicle body, the at least one front wheel and the at least one rear wheel to lean leftward when the leaning vehicle turns left, and rightward when the leaning vehicle turns right;
a steering handle that is mechanically connected to the at least one front wheel and is rotatable by a rider of the leaning vehicle to change a traveling direction of the leaning vehicle, the steering handle being rotatable counter-clockwise to turn the at least one front wheel left and being rotatable clockwise to turn the at least one front wheel right;
a steering-handle rotation sensor configured to detect an amount of rotation of the steering handle;
a lean actuator that is connected to the leaning device and that supplies power to the leaning device for leaning of the vehicle body, the at least one front wheel and the at least one rear wheel; and
a control unit that controls the lean actuator in accordance with an output signal of the steering-handle rotation sensor, wherein
the steering handle is configured to be
at a neutral position that permits the leaning vehicle to go straight,
rotatable counter-clockwise within a counter-clockwise rotatable range that is a range of counter-clockwise rotation from the neutral position, a part of the counter-clockwise rotatable range continuous from the neutral position being a first counter-clockwise rotation range, and
rotatable clockwise within a clockwise rotatable range that is a range of clockwise rotation from the neutral position, a part of the clockwise rotatable range continuous from the neutral position being a first clockwise rotation range; and
the control unit is configured to, upon determining that the detected amount of rotation is within the first counter-clockwise rotation range or the first clockwise rotation range, control the lean actuator to restrain the vehicle body, the at least one front wheel and the at least one rear wheel from leaning along with the rotation of the steering handle.

2. The leaning vehicle according to claim 1, wherein the control unit is configured to, upon determining that the detected amount of rotation is within the first counter-clockwise rotation range or the first clockwise rotation range, control the lean actuator to thereby keep the vehicle body, the at least one front wheel and the at least one rear wheel upright.

3. The leaning vehicle according to claim 2, wherein:
the steering handle is rotatable around an axis of rotation; and
an intersection point of the axis of rotation of the steering handle and a road surface is more frontward than a contact point between each of the at least one front wheel and the road surface.

4. The leaning vehicle according to claim 3, wherein the steering-handle rotation sensor is configured to maintain the output signal when the detected amount of rotation is within the first counter-clockwise rotation range or the first clockwise rotation range.

5. The leaning vehicle according to claim 2, wherein the steering-handle rotation sensor is configured to maintain the output signal when the detected amount of rotation is within the first counter-clockwise rotation range or the first clockwise rotation range.

6. The leaning vehicle according to claim 1, wherein:
the steering handle is rotatable around an axis of rotation; and
an intersection point of the axis of rotation of the steering handle and a road surface is more frontward than a contact point between each of the at least one front wheel and the road surface.

7. The leaning vehicle according to claim 1, wherein the steering-handle rotation sensor is configured to maintain the output signal when the detected amount of rotation is within the first counter-clockwise rotation range or the first clockwise rotation range.

* * * * *